(12) United States Patent
Ikegaya (10) Patent No.: US 10,761,305 B2
(45) Date of Patent: Sep. 1, 2020

(54) ZOOM LENS AND IMAGE PICKUP APPARATUS

(71) Applicant: CANON KABUSHIKI KAISHA, Tokyo (JP)

(72) Inventor: Yuki Ikegaya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 16/222,271

(22) Filed: Dec. 17, 2018

(65) Prior Publication Data

US 2019/0196160 A1 Jun. 27, 2019

(30) Foreign Application Priority Data

Dec. 21, 2017 (JP) ................. 2017-245014

(51) Int. Cl.
*G02B 15/16* (2006.01)
*G02B 13/02* (2006.01)

(52) U.S. Cl.
CPC ............. *G02B 15/16* (2013.01); *G02B 13/02* (2013.01)

(58) Field of Classification Search
CPC ................................ G02B 15/16; G02B 13/02
See application file for complete search history.

(56) References Cited

U.S. PATENT DOCUMENTS

| 9,618,731 | B2 | 4/2017 | Ikegaya | |
|---|---|---|---|---|
| 9,678,408 | B2 | 6/2017 | Ikegaya | |
| 10,073,252 | B2 | 9/2018 | Ikegaya | |
| 2016/0223800 | A1* | 8/2016 | Ikegaya | ................. G03B 13/32 |

FOREIGN PATENT DOCUMENTS

| JP | 2006171039 A | 6/2006 |
|---|---|---|
| JP | 2016114800 A | 6/2016 |

* cited by examiner

*Primary Examiner* — Wen Huang
(74) *Attorney, Agent, or Firm* — Carter, DeLuca & Farrell LLP (57) ABSTRACT

Provided is a zoom lens including: positive first unit; negative second unit; aperture stop; positive third unit; positive fourth unit; and rear lens group including at least one lens unit, wherein the fourth unit includes a positive lens, and wherein an amount of movement of the fourth unit during zooming from wide angle end to telephoto end, distances between the aperture stop and the fourth unit at the wide angle end and between the aperture stop and the fourth unit at the telephoto end, focal lengths of the fourth unit and of the zoom lens at the wide angle end, a length of the zoom lens at the wide angle end, an Abbe number of material of the positive lens with respect to d-line, and a partial dispersion ratio of the material of the positive lens with respect to g-line and F-line are each appropriately set.

14 Claims, 9 Drawing Sheets

ZOOM LENS AND IMAGE PICKUP APPARATUS

BACKGROUND OF THE INVENTION

Field of the Invention

The present invention relates to a zoom lens and an image pickup apparatus, which are suitable for being used as an image pickup optical system to be used for an image pickup apparatus such as a digital still camera, a digital video camera, a monitoring camera, and a TV camera.

Description of the Related Art

In recent years, there have been demands for a zoom lens for use in an image pickup apparatus to, for example, have high optical performance over the entire screen in the entire zoom range and be downsized in the entire system of the zoom lens. As a zoom lens having an advantage in terms of a high zoom ratio as compared to the related art, there has been known a positive lead type zoom lens in which a lens unit closest to an object side has a positive refractive power.

A large number of positive lead type zoom lenses form a retrofocus type zoom lens at a wide angle end and a telephoto type zoom lens at a telephoto end. Thus, a height of incidence of an axial marginal ray and a height of incidence of an off-axial principal ray on each lens surface are greatly changed. Therefore, during zooming, large variations are caused in various aberrations, in particular, chromatic aberrations such as an axial chromatic aberration and a chromatic aberration of magnification.

Hitherto, there has been known a positive lead type zoom lens in which a positive lens made of a low dispersion material having extraordinary partial dispersion, for example, fluorite, is arranged in the vicinity of an aperture stop at which the height of incidence of the axial marginal ray is high. With this configuration, the axial chromatic aberration is satisfactorily corrected in the entire zoom range.

In Japanese Patent Application Laid-Open No. 2016-114800, there is disclosed a zoom lens including, in order from an object side to an image side, a first lens unit having a positive refractive power, a second lens unit having a negative refractive power, an aperture stop, a third lens unit having a positive refractive power, and a fourth lens unit having a positive refractive power. Further, any lens included in the fourth lens unit is made with use of a low dispersion material having extraordinary partial dispersion.

In Japanese Patent Application Laid-Open No. 2006-171039, there is disclosed a zoom lens including, in order from an object side to an image side, a first lens unit having a positive refractive power, a second lens unit having a negative refractive power, an aperture stop, a third lens unit having a positive refractive power, a fourth lens unit having a positive refractive power, and a fifth lens unit having a positive refractive power. Further, a lens included in the fourth lens unit is made with use of a low dispersion material having extraordinary partial dispersion.

In the positive lead type zoom lens, it is relatively easy to increase the zoom ratio while downsizing the entire system of the zoom lens. In a large number of positive lead type zoom lenses, when the zoom ratio is increased while a focal length at the telephoto end is increased (long focal length is achieved), a large number of chromatic aberrations such as axial chromatic aberrations and chromatic aberrations of magnification occur in the entire zoom region. In the positive lead type zoom lens, when an effective diameter of a front lens is decreased while the entire lens length is shortened, in many cases, the axial chromatic aberration and the chromatic aberration of magnification are increased in the entire zoom region, and it becomes difficult to correct those various aberrations.

Further, in a large number of zoom lenses, how the chromatic aberration of magnification on a short wavelength side bends along with the increase in image pickup angle of view differs between the wide angle end and the telephoto end. Therefore, application of a material having an extraordinary partial dispersion property to a positive lens positioned on the image side with respect to the aperture stop is effective for the chromatic aberration of magnification at the wide angle end, but is not effective at the telephoto end.

In the above-mentioned positive lead type zoom lens, when the fourth lens unit is arranged close to the aperture stop and far from an image plane at the wide angle end, in a case where the effective diameter of the front lens is decreased, the lens unit having a high height of incidence of the off-axial principal ray is the first lens unit. In this case, it becomes difficult to correct the chromatic aberration of magnification at the wide angle end.

Meanwhile, when the fourth lens unit is arranged far from the aperture stop and close to the image plane at the telephoto end, in a case where the effective diameter of the front lens is decreased, the height of incidence of the off-axial principal ray in the fourth lens unit is relatively higher than that in the first lens unit. In this case, it becomes difficult to correct the chromatic aberration of magnification at the telephoto end.

In the above-mentioned positive lead type zoom lens, in order to increase the zoom ratio while downsizing the entire system of the zoom lens, it is important to appropriately set a relationship between the aperture stop and the fourth lens unit and a lens configuration of the fourth lens unit. When those configurations are not appropriately set, it becomes difficult to obtain a zoom lens in which chromatic aberrations are satisfactorily corrected and which has high optical performance in the entire zoom range while the entire system of the zoom lens is downsized.

SUMMARY OF THE INVENTION

According to one embodiment of the present invention, there is provided a zoom lens including, in order from an object side to an image side: a first lens unit having a positive refractive power; a second lens unit having a negative refractive power; an aperture stop; a third lens unit having a positive refractive power; a fourth lens unit having a positive refractive power; and a rear lens group including at least one lens unit, wherein an interval between each pair of adjacent lens units is changed during zooming, wherein the fourth lens unit includes a positive lens, and wherein the following conditional expressions are satisfied:

$$0.2 < -m4/Lw < 1.0;$$

$$0.1 < (Ds4w - Ds4t)/Lw < 0.2;$$

$$3.0 < f4/fw < 4.5; \text{ and}$$

$$0.0 < \theta gFp - (0.6438 - 0.001682 \times vdp),$$

where m4 represents an amount of movement of the fourth lens unit during zooming from a wide angle end to a telephoto end, Ds4w represents a distance between the aperture stop and the fourth lens unit at the wide angle end, Ds4t represents a distance between the aperture stop and the fourth lens unit at the telephoto end, f4 represents a focal length of the fourth lens unit, fw represents a focal length of the zoom lens at the wide angle end, Lw represents a length of the zoom lens at the wide angle end, vdp represents an Abbe number of a material of the positive lens with respect to a d-line, and θgFp represents a partial dispersion ratio of the material of the positive lens with respect to a g-line and an F-line.

Further features of the present invention will become apparent from the following description of exemplary embodiments with reference to the attached drawings.

DESCRIPTION OF THE EMBODIMENTS

Now, exemplary embodiments of the present invention are described in detail with reference to the accompanying drawings. A zoom lens according to one embodiment of the present invention consists of the following lens units arranged in order from an object side to an image side. Specifically, the zoom lens includes: a first lens unit having a positive refractive power (optical power is a reciprocal of a focal length); a second lens unit having a negative refractive power; an aperture stop; a third lens unit having a positive refractive power; a fourth lens unit having a positive refractive power; and a rear lens group including at least one lens unit. An interval between each pair of adjacent lens units is changed during zooming.

Figure 1:
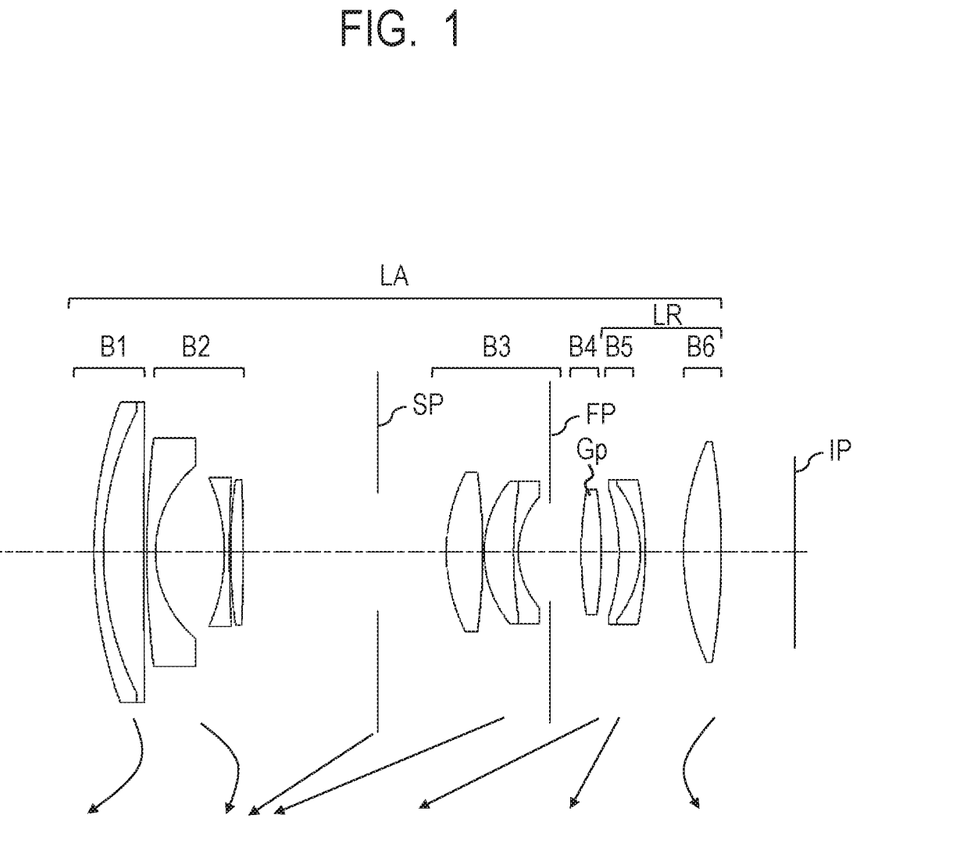
FIG. 1 is a lens cross-sectional view of a zoom lens of Embodiment 1 of the present invention when focus is on an object at infinity.
Figure 2A:
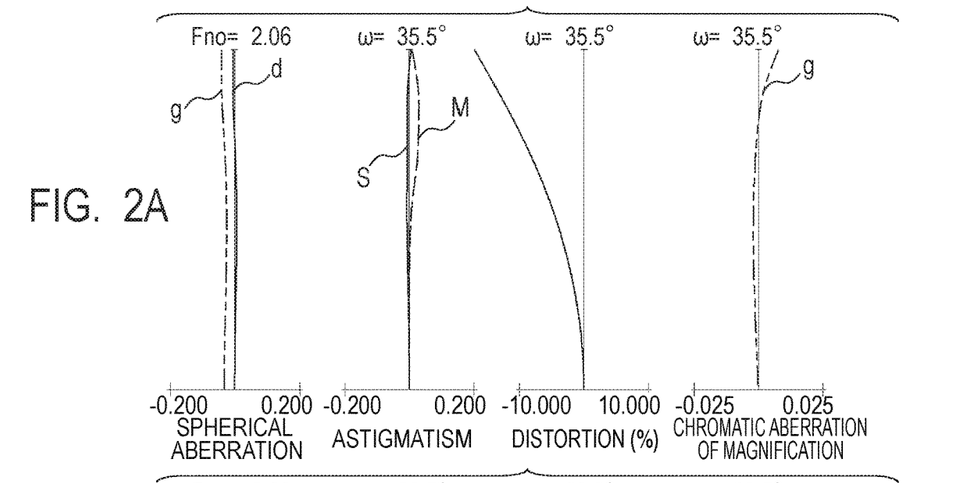
FIG. 2A is longitudinal aberration diagrams of the zoom lens of Embodiment 1 at a wide angle end when the focus is on the object at infinity.
Figure 2B:
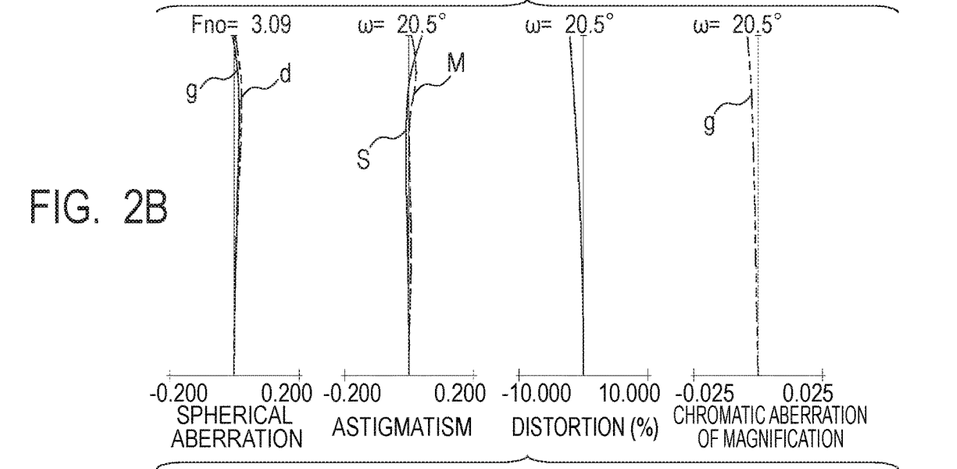
FIG. 2B is longitudinal aberration diagrams of the zoom lens of Embodiment 1 at an intermediate zoom position when the focus is on the object at infinity.
Figure 2C:
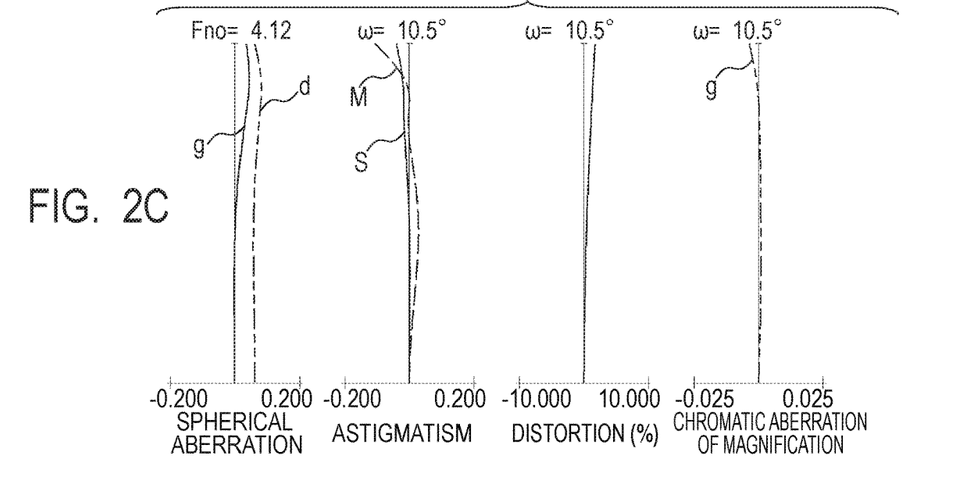
FIG. 2C is longitudinal aberration diagrams of the zoom lens of Embodiment 1 at a telephoto end when the focus is on the object at infinity.

FIG. 1 is a lens cross-sectional view of a zoom lens of Embodiment 1 of the present invention at a wide angle end. FIG. 2A, FIG. 2B, and FIG. 2C are aberration diagrams of the zoom lens of Embodiment 1 at the wide angle end (short focal length end), at an intermediate zoom position, and at a telephoto end (long focal length end), respectively. Embodiment 1 represents a zoom lens having a zoom ratio of 4.71 and an aperture ratio (F-number) of from about 2.06 to about 4.12.

Figure 3:
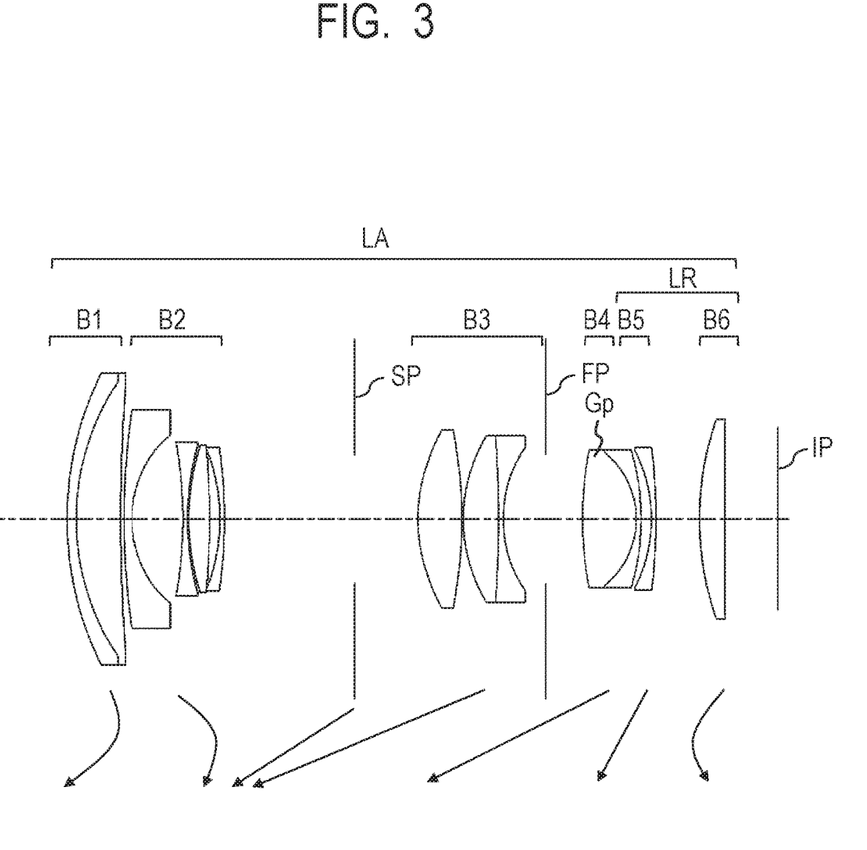
FIG. 3 is a lens cross-sectional view of a zoom lens of Embodiment 2 of the present invention when focus is on an object at infinity.
Figure 4A:
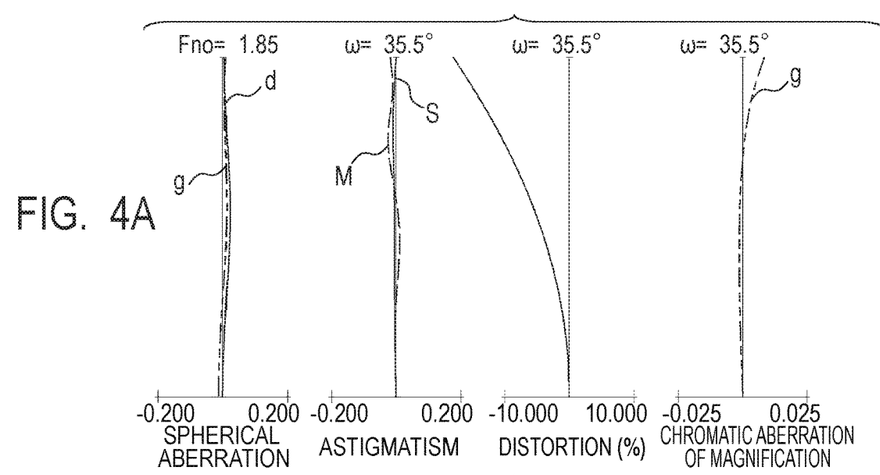
FIG. 4A is longitudinal aberration diagrams of the zoom lens of Embodiment 2 at a wide angle end when the focus is on the object at infinity.
Figure 4B:
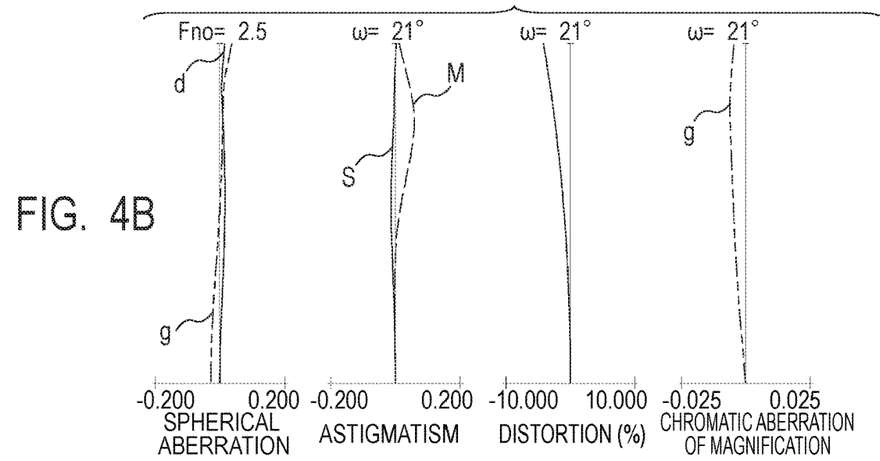
FIG. 4B is longitudinal aberration diagrams of the zoom lens of Embodiment 2 at an intermediate zoom position when the focus is on the object at infinity.
Figure 4C:
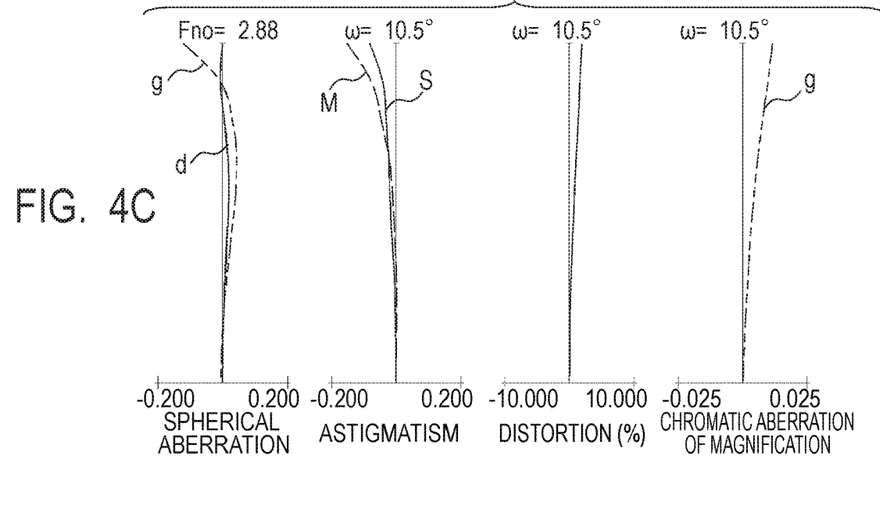
FIG. 4C is longitudinal aberration diagrams of the zoom lens of Embodiment 2 at a telephoto end when the focus is on the object at infinity.

FIG. 3 is a lens cross-sectional view of a zoom lens of Embodiment 2 of the present invention at a wide angle end. FIG. 4A, FIG. 4B, and FIG. 4C are aberration diagrams of the zoom lens of Embodiment 2 at the wide angle end, at an intermediate zoom position, and at a telephoto end, respectively. Embodiment 2 represents a zoom lens having a zoom ratio of 4.69 and an aperture ratio of from about 1.85 to about 2.88.

Figure 5:
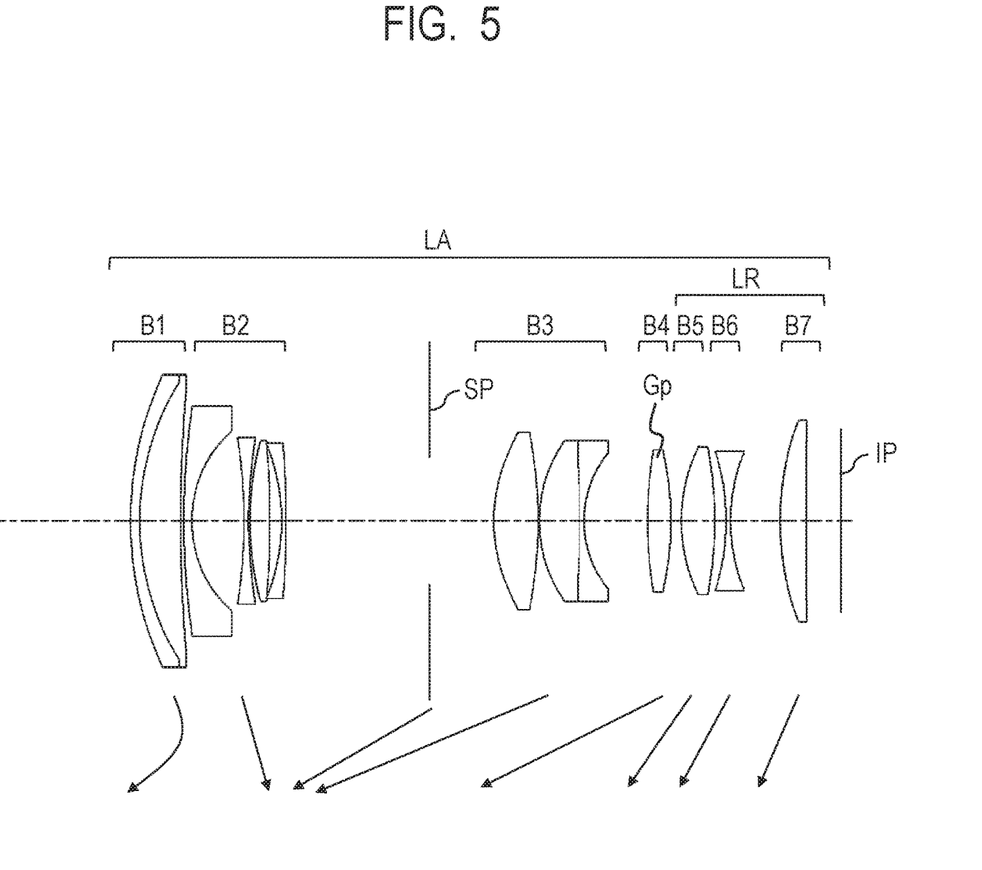
FIG. 5 is a lens cross-sectional view of a zoom lens of Embodiment 3 of the present invention when focus is on an object at infinity.
Figure 6A:
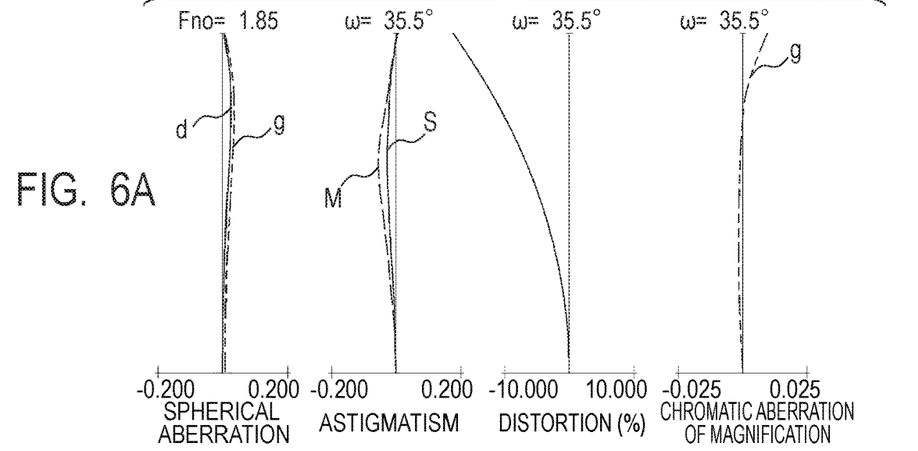
FIG. 6A is longitudinal aberration diagrams of the zoom lens of Embodiment 3 at a wide angle end when the focus is on the object at infinity.
Figure 6B:
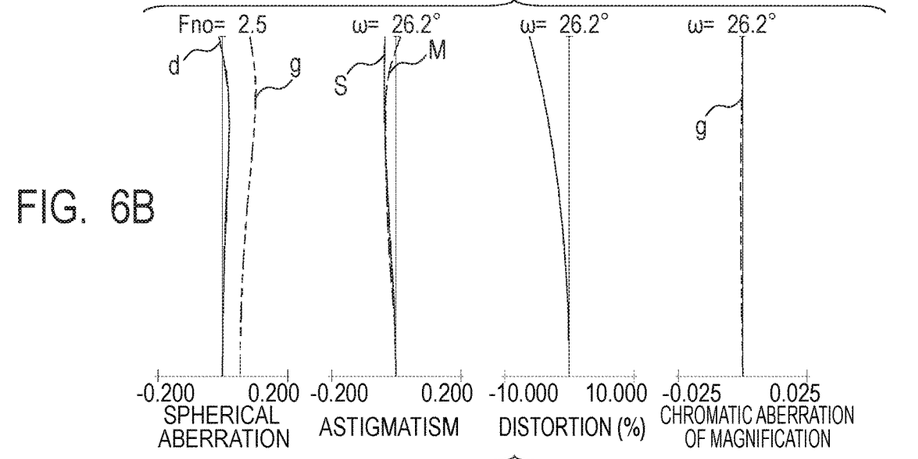
FIG. 6B is longitudinal aberration diagrams of the zoom lens of Embodiment 3 at an intermediate zoom position when the focus is on the object at infinity.
Figure 6C:
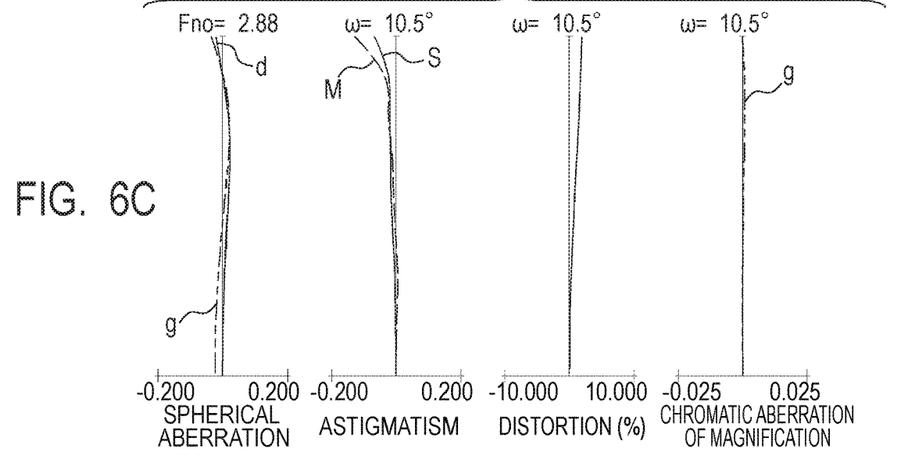
FIG. 6C is longitudinal aberration diagrams of the zoom lens of Embodiment 3 at a telephoto end when the focus is on the object at infinity.

FIG. 5 is a lens cross-sectional view of a zoom lens of Embodiment 3 of the present invention at a wide angle end. FIG. 6A, FIG. 6B, and FIG. 6C are aberration diagrams of the zoom lens of Embodiment 3 at the wide angle end, at an intermediate zoom position, and at a telephoto end, respectively. Embodiment 3 represents a zoom lens having a zoom ratio of 4.69 and an aperture ratio of from about 1.85 to about 2.88.

Figure 7:
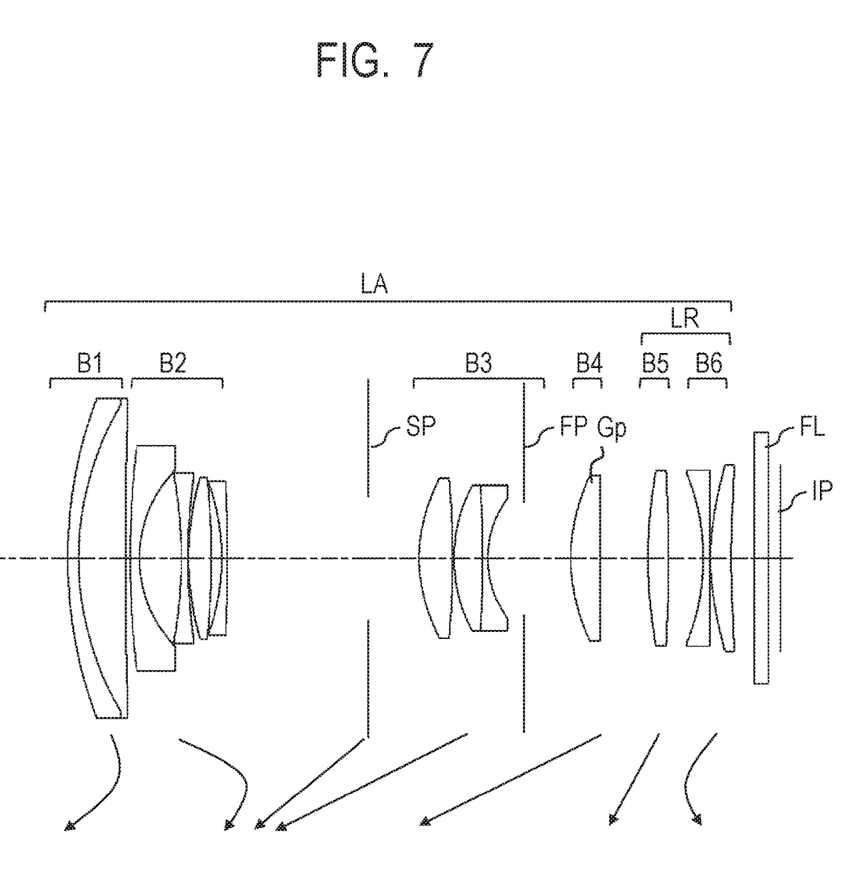
FIG. 7 is a lens cross-sectional view of a zoom lens of Embodiment 4 of the present invention when focus is on an object at infinity.
Figure 8A:
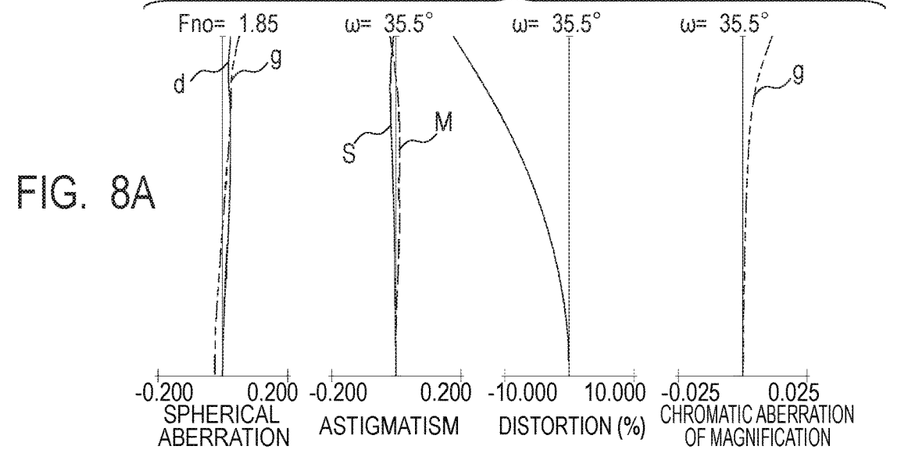
FIG. 8A is longitudinal aberration diagrams of the zoom lens of Embodiment 4 at a wide angle end when the focus is on the object at infinity.
Figure 8B:
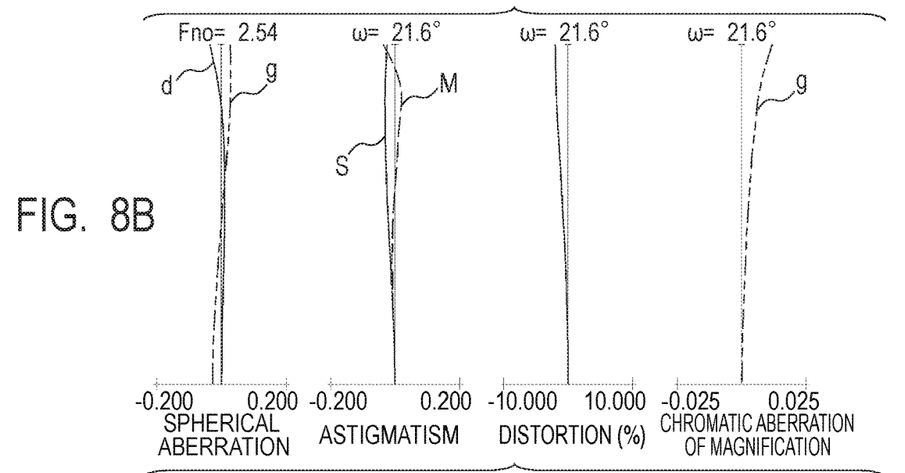
FIG. 8B is longitudinal aberration diagrams of the zoom lens of Embodiment 4 at an intermediate zoom position when the focus is on the object at infinity.
Figure 8C:
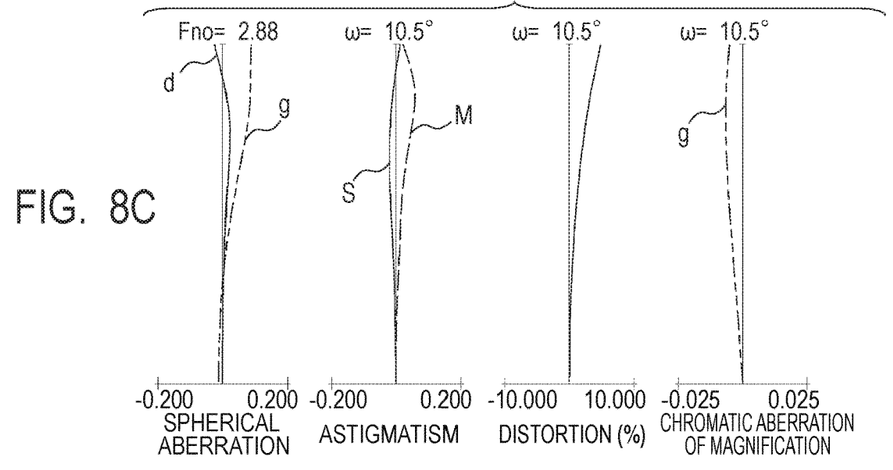
FIG. 8C is longitudinal aberration diagrams of the zoom lens of Embodiment 4 at a telephoto end when the focus is on the object at infinity.

FIG. 7 is a lens cross-sectional view of a zoom lens of Embodiment 4 of the present invention at a wide angle end. FIG. 8A, FIG. 8B, and FIG. 8C are aberration diagrams of the zoom lens of Embodiment 4 at the wide angle end, at an intermediate zoom position, and at a telephoto end, respectively. Embodiment 4 represents a zoom lens having a zoom ratio of 4.71 and an aperture ratio of from about 1.85 to about 2.88.

Figure 9:
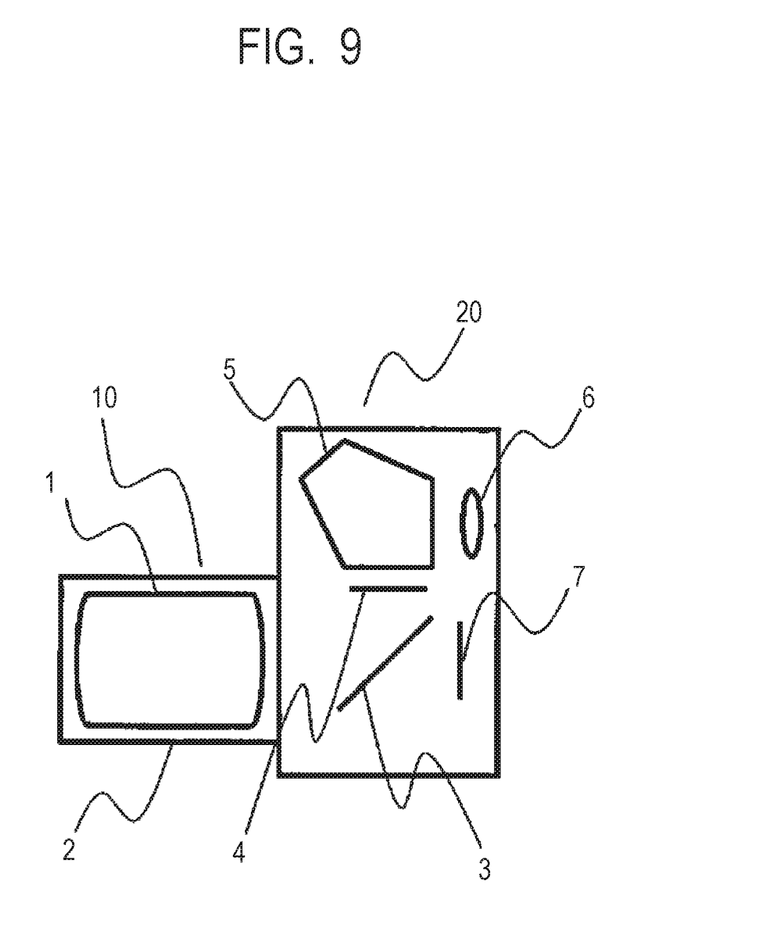
FIG. 9 is a schematic view of a main part of an image pickup apparatus of one embodiment of the present invention.

FIG. 9 is a schematic view of a main part of a digital still camera (image pickup apparatus) including the zoom lens according to one embodiment of the present invention.

The zoom lens of each Embodiment is an image pickup optical system to be used for an image pickup apparatus such as a video camera, a digital still camera, a monitoring camera, and a TV camera. The zoom lens of each Embodiment can also be used as a projection optical system for a projection apparatus (projector). In the lens cross-sectional views, the left side is the object side (front), and the right side is the image side (rear). Further, in the lens cross-sectional views, the zoom lens is represented by LA. When the order of a lens unit from the object side is represented by "i", the i-th lens unit is represented by Bi. A rear lens group LR includes at least one lens unit.

A positive lens is represented by Gp. The aperture stop is represented by SP. A flare cut stop is represented by FP. An optical block FL corresponds to, for example, an optical filter, a face plate, a low pass filter, or an infrared cut filter.

An image plane is represented by IP. The image plane IP corresponds to an image pickup plane of a solid-state image pickup element (photoelectric conversion element) such as a CCD sensor or a CMOS sensor when the zoom lens is used as an image pickup optical system of a video camera or a digital camera.

The arrows indicate movement loci of the respective lens units and the aperture stop SP during zooming (magnification varying) from the wide angle end to the telephoto end. In the spherical aberration diagrams, a solid line "d" indicates a d-line (wavelength of 587.6 nm), and a long dashed double-short dashed line "g" indicates a g-line (wavelength of 435.8 nm). In the astigmatism diagrams, a solid line S indicates a sagittal image plane in the d-line, and a dotted line M indicates a meridional image plane in the d-line. The distortion is represented for the d-line. In the diagrams of chromatic aberration of magnification, "g" indicates a chromatic aberration of magnification in the g-line, and is a value with respect to the d-line.

Symbol Fno represents an F-number, and symbol "w" represents a half angle of view (degrees) of the image pickup angle of view. When the following expression is satisfied:

$$Y=2f \times \tan(\omega/2),$$

where "f" represents a focal length of the entire system of the zoom lens and Y represents an ideal image height, the distortion diagrams represent a shift amount from the ideal image height Y.

In Embodiments described below, the wide angle end and the telephoto end refer to the respective zoom positions observed when a lens unit for varying magnification is located at both ends of a mechanically movable range thereof on an optical axis.

The zoom lens of each Embodiment consists of a first lens unit B1 having a positive refractive power, a second lens unit B2 having a negative refractive power, the aperture stop SP, a third lens unit B3 having a positive refractive power, a fourth lens unit B4 having a positive refractive power, and the rear lens group including at least one lens unit, which are arranged in order from the object side to the image side. During zooming from the wide angle end to the telephoto end, the first lens unit B1 moves along a locus convex to the image side, the third lens unit B3 moves toward the object side, and the fourth lens unit B4 moves toward the object side. Further, an interval between each pair of adjacent lens units is changed during zooming.

An amount of movement of the fourth lens unit B4 during zooming from the wide angle end to the telephoto end is represented by m4. In this case, the amount of movement of a lens unit corresponds to a difference in position on the optical axis of the lens unit at the wide angle end and at the telephoto end. The sign of the amount of movement is positive when the lens unit is positioned on the image side at the telephoto end as compared to the wide angle end, and is negative when the lens unit is positioned on the object side at the telephoto end as compared to the wide angle end.

A distance between the aperture stop SP and the fourth lens unit B4 at the wide angle end (distance on the optical axis between the aperture stop SP and a lens surface closest to the object side of the fourth lens unit B4 at the wide angle end) is represented by Ds4w, and a distance between the aperture stop SP and the fourth lens unit B4 at the telephoto end (distance on the optical axis between the aperture stop SP and the lens surface closest to the object side of the fourth lens unit B4 at the telephoto end) is represented by Ds4t. A focal length of the fourth lens unit B4 is represented by f4, a focal length of the entire system of the zoom lens at the wide angle end is represented by "fw", and the lens entire length at the wide angle end is represented by Lw. The fourth lens unit B4 includes a positive lens. An Abbe number of a material of the positive lens Gp included in the fourth lens unit B4 with respect to the d-line is represented by "νdp", and a partial dispersion ratio of the material of the positive lens Gp with respect to the g-line and an F-line is represented by θgFp.

At this time, the following conditional expressions are satisfied.

$$0.2 < -m4/Lw < 1.0 \quad (1)$$

$$0.1 < (Ds4w - Ds4t)/Lw < 0.2 \quad (2)$$

$$3.0 < f4/fw < 4.5 \quad (3)$$

$$0.0 < \theta gFp - (0.6438 - 0.001682 \times \nu dp) \quad (4)$$

An Abbe number νd and a partial dispersion ratio θgF of a material are represented as follows:

$$\nu d = (Nd-1)/(NF-NC); \text{ and}$$

$$\theta gF = (Ng-NF)/(NF-NC),$$

where Nd, NF, NC, and Ng represent refractive indices in the d-line, the F-line, a C-line, and the g-line of the Fraunhofer lines, respectively.

Next, technical meanings of the above-mentioned conditional expressions are described. Conditional Expression (1) is an expression for satisfactorily correcting the chromatic aberration of magnification at the telephoto end while the entire system of the zoom lens is downsized, and appropriately defines a ratio of the amount of movement of the fourth lens unit B4 during zooming from the wide angle end to the telephoto end to the entire lens length at the wide angle end.

When the ratio exceeds the upper limit value of Conditional Expression (1) and the amount of movement of the fourth lens unit B4 is increased, it becomes difficult to reduce the entire lens length at the telephoto end. When the ratio falls below the lower limit value of Conditional Expression (1) and the amount of movement of the fourth lens unit B4 is decreased, the height of incidence of the off-axial principal ray is increased because the fourth lens unit B4 becomes closer to the image plane at the telephoto end. Thus, it becomes difficult to correct the chromatic aberration of magnification at the telephoto end.

Conditional Expression (2) is an expression for satisfactorily correcting the axial chromatic aberration and the chromatic aberration of magnification at the wide angle end, and appropriately defines a ratio of change in interval between the aperture stop SP and the fourth lens unit B4 from the wide angle end to the telephoto end to the entire lens length at the wide angle end. When the ratio exceeds the upper limit value of Conditional Expression (2) and the change in interval between the aperture stop SP and the fourth lens unit B4 is increased, the fourth lens unit B4 becomes farther from the aperture stop SP at the wide angle end. Therefore, the height of incidence of the axial marginal ray is decreased, and it becomes difficult to satisfactorily correct the axial chromatic aberration at the wide angle end.

When the ratio falls below the lower limit value of Conditional Expression (2) and the change in interval between the aperture stop SP and the fourth lens unit B4 is decreased, the fourth lens unit B4 becomes closer to the aperture stop SP and far from the image plane at the wide angle end. Therefore, the height of incidence of the off-axial principal ray is decreased, and it becomes difficult to satisfactorily correct the chromatic aberration of magnification at the wide angle end.

Conditional Expression (3) is an expression for satisfactorily correcting the axial chromatic aberration and the chromatic aberration of magnification at the wide angle end and the telephoto end, and appropriately defines a ratio of the focal length of the fourth lens unit B4 to the focal length of the entire system of the zoom lens at the wide angle end. When the ratio exceeds the upper limit value of Conditional Expression (3) and the refractive power of the fourth lens unit B4 is decreased, it becomes difficult to satisfactorily correct the axial chromatic aberration and the chromatic aberration of magnification at the wide angle end and the telephoto end. When the ratio falls below the lower limit value of Conditional Expression (3) and the positive refractive power of the fourth lens unit B4 is increased, it becomes difficult to reduce variations in axial chromatic aberration during zooming.

Conditional Expression (4) is an expression for satisfactorily correcting the axial chromatic aberration and the chromatic aberration of magnification at the wide angle end and for satisfactorily correcting the axial chromatic aberration at the telephoto end, and appropriately defines the extraordinary partial dispersion property of the material of the positive lens Gp included in the fourth lens unit B4. When a value falls below the lower limit value of Conditional Expression (4) and the extraordinary partial dispersion property is decreased, it becomes difficult to satisfactorily correct the axial chromatic aberration and the chromatic aberration of magnification at the wide angle end and satisfactorily correct the axial chromatic aberration at the telephoto end.

It is further preferred to set the numerical value ranges of Conditional Expression (1) to Conditional Expression (4) as follows.

$$0.22 < -m4/Lw < 0.40 \quad (1a)$$

$$0.10 < (Ds4w - Ds4t)/Lw < 0.15 \quad (2a)$$

$$3.0 < f4/fw < 4.0 \quad (3a)$$

$$0.01 < \theta gFp - (0.6438 - 0.001682 \times vdp) \quad (4a)$$

As described above, according to one embodiment of the present invention, it is possible to obtain the small-sized zoom lens in which the axial chromatic aberration and the chromatic aberration of magnification are satisfactorily corrected in the entire zoom range.

In one embodiment of the present invention, it is further preferred to satisfy at least one of the following conditional expressions. A distance between the aperture stop SP and the third lens unit B3 at the wide angle end (distance on the optical axis between the aperture stop SP and a lens surface closest to the object side of the third lens unit B3 at the wide angle end) is represented by Ds3w. A distance between the aperture stop SP and the third lens unit B3 at the telephoto end (distance on the optical axis between the aperture stop SP and the lens surface closest to the object side of the third lens unit B3 at the telephoto end) is represented by Ds3t. A distance between the fourth lens unit B4 and the image plane at the wide angle end is represented by D4iw. A focal length of the entire system of the zoom lens at the telephoto end is represented by "ft". A combined focal length of a lens system from the first lens unit B1 to the fourth lens unit B4 at the wide angle end is represented by f1234w.

At this time, it is preferred to satisfy at least one of the following conditional expressions.

$$vdp > 60 \quad (5)$$

$$0.0 < (Ds3w - Ds3t)/Lw < 0.2 \quad (6)$$

$$0.0 < D4iw/Lw < 0.3 \quad (7)$$

$$0.4 < f4/ft < 0.8 \quad (8)$$

$$0.8 < f1234w/fw < 1.5 \quad (9)$$

Next, technical meanings of the above-mentioned conditional expressions are described. Conditional Expression (5) is an expression for satisfactorily correcting the axial chromatic aberration and the chromatic aberration of magnification at the wide angle end and the telephoto end, and appropriately defines the Abbe number of the material of the positive lens Gp included in the fourth lens unit B4 with respect to the d-line. When a value falls below the lower limit value of Conditional Expression (5) and the Abbe number of the material of the positive lens Gp is decreased, it becomes difficult to correct the axial chromatic aberration and the chromatic aberration of magnification at the wide angle end and the telephoto end.

Conditional Expression (6) is an expression for reducing a lens outer diameter and the entire lens length at the telephoto end, and appropriately defines a ratio of the change in interval between the aperture stop SP and the third lens unit B3 from the wide angle end to the telephoto end to the entire lens length at the wide angle end. When the ratio exceeds the upper limit value of Conditional Expression (6) and the third lens unit B3 is separated away from the aperture stop SP at the wide angle end, the effective outer diameter of the third lens unit B3 is increased, and it becomes difficult to reduce the lens outer diameter. When the ratio falls below the lower limit value of Conditional Expression (6) and the third lens unit B3 is separated away from the aperture stop SP at the telephoto end, it becomes difficult to reduce the entire lens length at the telephoto end.

Conditional Expression (7) is an expression for satisfactorily correcting the axial chromatic aberration and the chromatic aberration of magnification at the wide angle end, and appropriately defines a ratio of the distance from the fourth lens unit B4 to the image plane at the wide angle end to the entire lens length at the wide angle end. When the ratio exceeds the upper limit value of Conditional Expression (7) and the fourth lens unit B4 becomes more distant from the image plane at the wide angle end, it becomes difficult to increase the height of incidence of the off-axial principal ray, and it becomes difficult to correct the chromatic aberration of magnification at the wide angle end.

When the ratio falls below the lower limit value of Conditional Expression (7) and the fourth lens unit B4 becomes closer to the image plane at the wide angle end, the fourth lens unit B4 becomes farther from the aperture stop SP. Therefore, it becomes difficult to increase the height of incidence of the axial marginal ray, and it becomes difficult to correct the axial chromatic aberration at the wide angle end.

Conditional Expression (8) is an expression for satisfactorily correcting the axial chromatic aberration and the chromatic aberration of magnification at the wide angle end and the telephoto end, and appropriately defines a ratio of the focal length of the fourth lens unit B4 to the focal length of the entire system of the zoom lens at the telephoto end. When the ratio exceeds the upper limit value of Conditional Expression (8) and the positive refractive power of the fourth lens unit B4 is decreased, it becomes difficult to satisfactorily correct the axial chromatic aberration and the chromatic aberration of magnification at the wide angle end and the telephoto end. When the ratio falls below the lower limit value of Conditional Expression (8) and the positive refractive power of the fourth lens unit B4 is increased, it becomes difficult to reduce variations in axial chromatic aberration during zooming.

Conditional Expression (9) is an expression for satisfactorily correcting the chromatic aberration of magnification at the wide angle end, and appropriately defines a ratio of the combined focal length of the lens system from the first lens unit B1 to the fourth lens unit B4 at the wide angle end to the focal length of the entire system of the zoom lens at the wide angle end. When the ratio exceeds the upper limit value of Conditional Expression (9) and the refractive power of the lens system from the first lens unit B1 to the fourth lens unit B4 at the wide angle end becomes smaller relative to the refractive power of the entire lens system at the wide angle end, the refractive power of the rear lens group LR positioned on the image side with respect to the fourth lens unit B4 is increased. In this case, the height of incidence of the off-axial principal ray in the fourth lens unit B4 is decreased, and it becomes difficult to satisfactorily correct the chromatic aberration of magnification at the wide angle end.

When the ratio exceeds the lower limit value of Conditional Expression (9) and the refractive power of the lens system from the first lens unit B1 to the fourth lens unit B4 at the wide angle end becomes larger relative to the refractive power of the entire system at the wide angle end, the refractive power of the rear lens group LR positioned on the image side with respect to the fourth lens unit B4 becomes negative. In this case, the height of incidence of the off-axial principal ray in the fourth lens unit B4 is decreased, and it becomes difficult to satisfactorily correct the chromatic aberration of magnification at the wide angle end. Further, it becomes difficult to decrease an angle of incidence of the off-axial ray to the image plane.

In each Embodiment, it is further preferred to set the numerical value ranges of Conditional Expression (3) to Conditional Expression (5) as follows.

$$vdp > 65 \quad (5a)$$

$$0.03 < (Ds3w - Ds3t)/Lw < 0.10 \quad (6a)$$

$$0.15 < D4iw/Lw < 0.28 \quad (7a)$$

$$0.60 < f4/ft < 0.78 \quad (8a)$$

$$0.82 < f1234w/fw < 1.15 \quad (9a)$$

In each Embodiment, in order to reduce the entire lens length, it is preferred that the fourth lens unit B4 consist of one positive lens. Alternatively, it is preferred that the fourth lens unit B4 consist of a cemented lens obtained by cementing a positive lens and a negative lens to each other.

Next, the lens configuration of the zoom lens LA of each Embodiment is described.

Embodiment 1

The lens configuration of the zoom lens of Embodiment 1 of the present invention is as follows in order from the object side to the image side. The zoom lens of Embodiment 1 consists of the first lens unit B1 having a positive refractive power, the second lens unit B2 having a negative refractive power, the third lens unit B3 having a positive refractive power, the fourth lens unit B4 having a positive refractive power, a fifth lens unit B5 having a negative refractive power, and a sixth lens unit B6 having a positive refractive power. The rear lens group LR consists of the fifth lens unit B5 and the sixth lens unit B6. The fourth lens unit B4 consists of one positive lens Gp, and the partial dispersion ratio θgFp of the material of the positive lens Gp is 0.5375.

Embodiment 2

The number of lens units and the signs of the refractive powers of the respective lens units in the zoom lens of Embodiment 2 of the present invention are the same as those in Embodiment 1. The fourth lens unit B4 consists of a cemented lens obtained by cementing one positive lens Gp and one negative lens to each other, and the partial dispersion ratio θgFp of the material of the positive lens Gp is 0.5375.

Embodiment 3

The lens configuration of the zoom lens of Embodiment 3 of the present invention is as follows in order from the object side to the image side. The zoom lens of Embodiment 3 consists of the first lens unit B1 having a positive refractive power, the second lens unit B2 having a negative refractive power, the third lens unit B3 having a positive refractive power, the fourth lens unit B4 having a positive refractive power, the fifth lens unit B5 having a positive refractive power, the sixth lens unit B6 having a negative refractive power, and a seventh lens unit B7 having a positive refractive power. The rear lens group LR consists of the fifth lens unit B5, the sixth lens unit B6, and the seventh lens unit B7. The fourth lens unit B4 consists of one positive lens Gp, and the partial dispersion ratio θgFp of the material of the positive lens Gp is 0.5375.

Embodiment 4

The lens configuration of the zoom lens of Embodiment 4 of the present invention is as follows in order from the object side to the image side. The zoom lens of Embodiment 4 consists of the first lens unit B1 having a positive refractive power, the second lens unit B2 having a negative refractive power, the third lens unit B3 having a positive refractive power, the fourth lens unit B4 having a positive refractive power, the fifth lens unit B5 having a positive refractive power, and the sixth lens unit B6 having a negative refractive power. The rear lens group LR consists of the fifth lens unit B5 and the sixth lens unit B6. The fourth lens unit B4 consists of one positive lens Gp, and the partial dispersion ratio θgFp of the material of the positive lens Gp is 0.5375.

The exemplary embodiments of the present invention are described above, but the present invention is not limited to those embodiments and can be modified and changed variously within the scope of the gist thereof.

Next, a single-lens reflex camera serving as an image pickup apparatus of FIG. 9 is described. In FIG. 9, an image pickup optical system 10 includes a zoom lens 1 of any one of Embodiments 1 to 4. The image pickup optical system 10 is held by a lens barrel 2 serving as a holding member. A camera main body 20 includes a quick return mirror 3, a focusing plate 4, a penta roof prism 5, an eyepiece 6, and other members. The quick return mirror 3 reflects a ray from the image pickup optical system 10 upward. The focusing plate 4 is arranged at an image forming position of the image pickup optical system 10. The penta roof prism 5 converts a reverse image formed on the focusing plate 4 into an erected image.

An observer observes the erected image through the eyepiece 6. On an image plane 7, there is arranged an image pickup element (photoelectric conversion element) such as a CCD sensor or a CMOS sensor configured to receive the image. When an image is to be taken, the quick return mirror 3 is retracted from the optical path, and an image is formed on the image plane 7 by the image pickup optical system 10.

In this way, by applying the zoom lens to an image pickup optical system, for example, a single-lens reflex camera interchangeable lens, it is possible to provide an image pickup apparatus having high optical performance. The zoom lens of each Embodiment of the present invention can be applied not only to a digital camera and a video camera, but also to optical equipment such as a telescope, binoculars, a copying machine, and a projector. Further, the present invention is equally applicable to a mirrorless single-lens reflex camera without the quick return mirror.

Numerical Data 1 to 4 corresponding to Embodiments 1 to 4, respectively, are described below. In each numerical data set, "i" indicates the order of a surface from the object side, "ri" indicates an i-th curvature radius (curvature radius of i-th surface), "di" indicates an interval between the i-th surface and an (i+1)-th surface, and "ndi" and "vdi" indicate a refractive index and an Abbe number, respectively, of an optical medium between the i-th surface and the (i+1)-th surface with respect to the d-line. BF indicates a back focus based on air conversion. A total lens length is a value obtained by adding the value of the back focus to a length from the first lens surface to the final lens surface.

In addition, an aspherical surface is indicated by a suffix "*" of the surface number. An aspherical surface shape is expressed by the following expression, where X represents a displacement from a surface vertex in the optical axis direction, "h" represents a height from the optical axis in the direction perpendicular to the optical axis, "r" represents a paraxial curvature radius, K represents a conic constant, and A4, A6, A8, and A10 represent aspherical coefficients of individual orders.

$$X(h) = \frac{(1/r)h^2}{1+\sqrt{1-(1+K)(h/r)^2}} + A4 \cdot h^4 + A6 \cdot h^6 + +A8 \cdot h^8 + A10 \cdot h^{10}$$

Further, "e±XX" in each aspherical coefficient means "×10$^{\pm XX}$". Further, values corresponding to the individual conditional expressions are shown in Table 1. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

(Numerical Data 1)

| Unit: mm | | | | |
|---|---|---|---|---|
| Surface data | | | | |
| Surface number | r | d | nd | vd |
| 1 | 35.748 | 0.80 | 1.94595 | 18.0 |
| 2 | 25.706 | 3.30 | 1.80420 | 46.5 |
| 3 | 543.180 | (Variable) | | |
| 4 | 80.064 | 0.70 | 1.77444 | 49.2 |
| 5 | 9.248 | 5.71 | | |
| 6* | −15.545 | 0.40 | 1.72897 | 54.1 |
| 7 | 110.339 | 0.10 | | |
| 8 | 41.819 | 1.06 | 1.95906 | 17.5 |
| 9 | −138.749 | (Variable) | | |
| 10 (Stop) | ∞ | (Variable) | | |
| 11* | 13.691 | 3.03 | 1.72933 | 54.0 |
| 12* | −42.930 | 0.10 | | |
| 13 | 9.121 | 2.43 | 1.81500 | 43.9 |
| 14 | 34.741 | 0.40 | 1.85478 | 24.8 |
| 15 | 6.849 | 2.59 | | |
| 16 | ∞ | (Variable) | | |
| 17 | 30.040 | 1.66 | 1.49700 | 81.5 |
| 18 | −35.458 | (Variable) | | |
| 19 | −16.381 | 1.77 | 1.48749 | 70.2 |
| 20 | −8.842 | 0.40 | 1.83481 | 42.7 |
| 21* | −26.610 | (Variable) | | |
| 22 | 22.374 | 3.14 | 1.58137 | 52.5 |
| 23 | −52.492 | (Variable) | | |
| Image plane | ∞ | | | |

| Aspherical surface data |
|---|
| Sixth surface |

| K = 0.00000e+000 | A4 = −1.31742e−005 | A6 = −4.55564e−007 |
|---|---|---|
| A8 = −4.19545e−009 | A10 = 9.51074e−011 | |

Eleventh surface

| K = 0.00000e+000 | A4 = −5.73243e−005 | A6 = 2.32783e−007 |
|---|---|---|

Twelfth surface

| K = 0.00000e+000 | A4 = 1.51306e−005 | A6 = 3.05920e−007 |
|---|---|---|
| A8 = 1.25557e−009 | A10 = −1.61164e−011 | |

Twenty-first surface

| K = 0.00000e+000 | A4 = 4.29039e−005 | A6 = −4.64752e−007 |
|---|---|---|
| A8 = 2.32581e−008 | A10 = −4.09714e−010 | |

Various data
Zoom ratio 4.71

| | Wide angle | Intermediate | Telephoto |
|---|---|---|---|
| Focal length | 9.06 | 20.45 | 42.68 |
| F-number | 2.06 | 3.09 | 4.12 |
| Half angle of view (degrees) | 35.52 | 20.52 | 10.47 |
| Image height | 6.47 | 7.65 | 7.89 |
| Total lens length | 58.00 | 62.54 | 75.00 |
| BF | 6.06 | 12.67 | 10.31 |
| d3 | 0.30 | 8.09 | 16.91 |
| d9 | 11.11 | 2.47 | 0.70 |
| d10 | 5.69 | 3.44 | 1.20 |
| d16 | 2.62 | 2.84 | 1.20 |
| d18 | 1.47 | 3.63 | 8.84 |
| d21 | 3.17 | 1.82 | 8.26 |
| d23 | 6.06 | 12.67 | 10.31 |

Lens unit data

| Unit | First surface | Focal length |
|---|---|---|
| 1 | 1 | 51.02 |
| 2 | 4 | −9.47 |
| 3 | 11 | 15.03 |
| 4 | 17 | 33.00 |
| 5 | 19 | −26.69 |
| 6 | 22 | 27.41 |

(Numerical Data 2)

Unit: mm

Surface data

| Surface number | r | d | nd | vd |
|---|---|---|---|---|
| 1 | 28.210 | 0.80 | 1.94595 | 18.0 |
| 2 | 21.256 | 3.83 | 1.80420 | 46.5 |
| 3 | 150.202 | (Variable) | | |
| 4 | 63.578 | 0.70 | 1.88202 | 37.2 |
| 5* | 9.748 | 4.42 | | |
| 6 | −37.766 | 0.40 | 1.88202 | 37.2 |
| 7 | 22.940 | 0.10 | | |
| 8 | 20.324 | 1.80 | 1.95906 | 17.5 |
| 9 | −68.337 | 0.91 | | |
| 10 | −16.009 | 0.40 | 1.77250 | 49.6 |
| 11 | −40.867 | (Variable) | | |
| 12 (Stop) | ∞ | (Variable) | | |
| 13* | 14.347 | 3.82 | 1.71505 | 54.7 |
| 14* | −31.882 | 0.10 | | |
| 15 | 13.881 | 3.03 | 1.77250 | 49.6 |
| 16 | −99.860 | 0.40 | 1.85478 | 24.8 |
| 17 | 10.916 | 3.69 | | |
| 18 | ∞ | (Variable) | | |
| 19 | 28.578 | 4.68 | 1.59522 | 67.7 |
| 20 | −7.281 | 0.40 | 1.72916 | 54.7 |
| 21 | −21.269 | (Variable) | | |
| 22 | −12.810 | 0.40 | 1.72916 | 54.7 |
| 23 | −52.805 | (Variable) | | |
| 24* | 25.826 | 2.18 | 1.85135 | 40.1 |
| 25 | 989.614 | (Variable) | | |
| Image plane | ∞ | | | |

Aspherical surface data

Fifth surface

K = 0.00000e+000   A4 = 7.75867e−006   A6 = 1.03138e−006
A8 = −3.15169e−008   A10 = 5.73780e−010

Thirteenth surface

K = 0.00000e+000   A4 = −4.68525e−005   A6 = 1.15717e−007

Fourteenth surface

K = 0.00000e+000   A4 = 4.23102e−005   A6 = 4.09057e−010
A8 = 2.49087e−009   A10 = −1.77132e−011

Twenty-fourth surface

K = 0.00000e+000   A4 = −1.40091e−005   A6 = 2.07206e−007
A8 = −7.68794e−010   A10 = 1.07827e−014

Various data
Zoom ratio 4.69

| | Wide angle | Intermediate | Telephoto |
|---|---|---|---|
| Focal length | 9.06 | 19.98 | 42.50 |
| F-number | 1.85 | 2.50 | 2.88 |
| Half angle of view (degrees) | 35.52 | 20.96 | 10.52 |
| Image height | 6.47 | 7.65 | 7.89 |
| Total lens length | 61.50 | 64.46 | 74.50 |
| BF | 4.58 | 10.07 | 7.43 |
| d3 | 0.30 | 7.15 | 15.05 |
| d11 | 11.22 | 2.94 | 0.70 |
| d12 | 5.52 | 3.36 | 1.20 |
| d18 | 3.18 | 1.42 | 1.20 |
| d21 | 0.89 | 4.23 | 9.14 |
| d23 | 3.76 | 3.24 | 7.74 |
| d25 | 4.58 | 10.07 | 7.43 |

Lens unit data

| Unit | First surface | Focal length |
|---|---|---|
| 1 | 1 | 45.49 |
| 2 | 4 | −8.45 |
| 3 | 13 | 14.89 |
| 4 | 19 | 28.00 |
| 5 | 22 | −23.29 |
| 6 | 24 | 31.12 |

(Numerical Data 3)

Unit: mm

Surface data

| Surface number | r | d | nd | vd |
|---|---|---|---|---|
| 1 | 29.988 | 0.80 | 1.94595 | 18.0 |
| 2 | 22.821 | 3.51 | 1.80420 | 46.5 |
| 3 | 129.055 | (Variable) | | |
| 4 | 66.530 | 0.70 | 1.88202 | 37.2 |
| 5* | 10.469 | 4.54 | | |
| 6 | −45.781 | 0.40 | 1.88202 | 37.2 |
| 7 | 43.487 | 0.10 | | |
| 8 | 25.818 | 1.74 | 1.95906 | 17.5 |
| 9 | −78.185 | 1.02 | | |
| 10 | −17.234 | 0.40 | 1.77250 | 49.6 |
| 11 | −80.350 | (Variable) | | |
| 12 (Stop) | ∞ | (Variable) | | |
| 13* | 13.672 | 3.83 | 1.78086 | 48.3 |
| 14* | −34.303 | 0.10 | | |
| 15 | 12.002 | 3.46 | 1.49695 | 81.6 |
| 16 | −124.118 | 0.40 | 1.85478 | 24.8 |
| 17 | 9.243 | (Variable) | | |
| 18 | 33.948 | 2.07 | 1.49700 | 81.5 |
| 19 | −26.472 | (Variable) | | |
| 20 | 14.272 | 2.89 | 1.63694 | 35.9 |
| 21 | −33.629 | (Variable) | | |
| 22 | −20.390 | 0.40 | 1.88236 | 37.2 |
| 23 | 15.357 | (Variable) | | |
| 24* | 25.056 | 2.20 | 1.85135 | 40.1 |
| 25 | 290.032 | (Variable) | | |
| Image plane | ∞ | | | |

Aspherical surface data

Fifth surface

K = 0.00000e+000   A4 = 3.67272e−006   A6 = 3.21767e−007
A8 = −6.27558e−009   A10 = 1.44654e−010

Thirteenth surface

K = 0.00000e+000   A4 = −5.64138e−005   A6 = −1.36603e−007

Fourteenth surface

K = 0.00000e+000   A4 = 3.91437e−005   A6 = −1.55738e−007
A8 = 7.92017e−010   A10 = 2.40964e−012

Twenty-fourth surface

K = 0.00000e+000   A4 = −7.53019e−006   A6 = 2.38999e−007
A8 = −6.38981e−010   A10 = 1.07827e−014

Various data
Zoom ratio 4.69

| | Wide angle | Intermediate | Telephoto |
|---|---|---|---|
| Focal length | 9.06 | 15.52 | 42.50 |
| F-number | 1.85 | 2.50 | 2.88 |
| Half angle of view (degrees) | 35.52 | 26.25 | 10.52 |
| Image height | 6.47 | 7.65 | 7.89 |
| Total lens length | 61.50 | 58.21 | 73.50 |
| BF | 3.05 | 6.06 | 7.33 |
| d3 | 0.29 | −0.11 | 16.51 |
| d11 | 12.41 | 5.76 | 0.69 |
| d12 | 5.57 | 3.38 | 1.19 |
| d17 | 5.49 | 3.61 | 2.85 |
| d19 | 0.89 | 0.40 | 1.83 |

-continued

Unit: mm

| | | | |
|---|---|---|---|
| d21 | 0.96 | 1.41 | 2.76 |
| d23 | 4.30 | 9.14 | 11.78 |
| d25 | 3.05 | 6.06 | 7.33 |

Lens unit data

| Unit | First surface | Focal length |
|---|---|---|
| 1 | 1 | 51.10 |
| 2 | 4 | −9.34 |
| 3 | 13 | 17.45 |
| 4 | 18 | 30.27 |
| 5 | 20 | 16.11 |
| 6 | 22 | −9.88 |
| 7 | 24 | 32.09 |

(Numerical Data 4)

Unit: mm

Surface data

| Surface number | r | d | nd | νd |
|---|---|---|---|---|
| 1 | 38.292 | 0.94 | 1.94595 | 18.0 |
| 2 | 25.320 | 4.00 | 1.83481 | 42.7 |
| 3 | 548.892 | (Variable) | | |
| 4* | 80.887 | 0.80 | 1.85135 | 40.1 |
| 5* | 10.835 | 3.57 | | |
| 6 | −39.238 | 0.55 | 1.88300 | 40.8 |
| 7 | 48.662 | 0.05 | | |
| 8 | 23.994 | 1.93 | 1.95906 | 17.5 |
| 9 | −67.714 | 0.90 | | |
| 10 | −18.567 | 0.48 | 1.83481 | 42.7 |
| 11 | −170.195 | (Variable) | | |
| 12 (Stop) | ∞ | (Variable) | | |
| 13* | 13.292 | 2.85 | 1.85135 | 40.1 |
| 14* | −62.944 | 0.10 | | |
| 15 | 12.849 | 2.43 | 1.69560 | 59.0 |
| 16 | −106.992 | 0.45 | 1.85478 | 24.8 |
| 17 | 8.587 | 3.06 | | |
| 18 | ∞ | (Variable) | | |
| 19 | 15.325 | 2.55 | 1.49700 | 81.5 |
| 20 | −1,681.932 | (Variable) | | |
| 21* | 36.298 | 1.73 | 1.72903 | 54.0 |
| 22 | −145.333 | (Variable) | | |
| 23 | −18.822 | 0.55 | 1.90043 | 37.4 |
| 24 | −772.324 | 0.05 | | |
| 25* | 20.207 | 1.75 | 1.85135 | 40.1 |
| 26* | 56.757 | (Variable) | | |
| 27 | ∞ | 1.20 | 1.51633 | 64.1 |
| 28 | ∞ | 1.00 | | |
| Image plane | ∞ | | | |

Aspherical surface data

Fourth surface

K = 0.00000e+000   A4 = 2.71243e−005   A6 = −5.75446e−007
A8 = 5.18260e−009   A10 = −2.06527e−011

Fifth surface

K = −2.62097e+000   A4 = 2.94628e−004   A6 = −6.65731e−007
A8 = −5.22277e−009   A10 = 3.65141e−010   A12 = −2.74055e−012

-continued

Unit: mm

Thirteenth surface

K = 0.00000e+000   A4 = −5.21935e−005   A6 = 1.81936e−007
A8 = −7.42691e−009   A10 = 1.09338e−010   A12 = −1.22463e−012

Fourteenth surface

K = 0.00000e+000   A4 = 2.66571e−005   A6 = 1.12403e−007
A8 = −3.08743e−009

Twenty-first surface

K = 0.00000e+000   A4 = −1.52341e−005   A6 = −4.32015e−007
A8 = 5.95260e−009   A10 = −5.82937e−011

Twenty-fifth surface

K = 0.00000e+000   A4 = −1.50082e−004   A6 = 1.11431e−006
A8 = −5.09258e−009   A10 = 2.73515e−011

Twenty-sixth surface

K = 0.00000e+000   A4 = −1.19959e−004   A6 = 8.25203e−007

Various data
Zoom ratio 4.71

| | Wide angle | Intermediate | Telephoto |
|---|---|---|---|
| Focal length | 9.06 | 19.11 | 42.70 |
| F-number | 1.85 | 2.54 | 2.88 |
| Half angle of view (degrees) | 35.52 | 21.62 | 10.47 |
| Image height | 6.47 | 7.57 | 7.89 |
| Total lens length | 60.21 | 63.39 | 75.55 |
| BF | 3.77 | 8.05 | 8.00 |
| d3 | 0.38 | 7.35 | 18.93 |
| d11 | 12.05 | 2.86 | 0.35 |
| d12 | 4.27 | 3.58 | 0.55 |
| d18 | 3.98 | 2.64 | 1.35 |
| d20 | 4.04 | 5.60 | 9.30 |
| d22 | 2.98 | 4.58 | 8.32 |
| d26 | 1.98 | 6.26 | 6.21 |

Lens unit data

| Unit | First surface | Focal length |
|---|---|---|
| 1 | 1 | 52.82 |
| 2 | 4 | −9.62 |
| 3 | 13 | 18.06 |
| 4 | 19 | 30.57 |
| 5 | 21 | 40.00 |
| 6 | 23 | −52.24 |

TABLE 1

| Conditional Expression | Embodiment 1 | Embodiment 2 | Embodiment 3 | Embodiment 4 |
|---|---|---|---|---|
| (1) $0.2 < -m4/Lw < 1.0$ | 0.288 | 0.245 | 0.236 | 0.245 |
| (2) $0.1 < (Ds4w - Ds4t)/Lw < 0.2$ | 0.102 | 0.102 | 0.114 | 0.105 |
| (3) $3.0 < f4/fw < 4.5$ | 3.641 | 3.089 | 3.340 | 3.373 |
| (4) $0.0 < \theta gFp - (0.6438 - 0.001682 \times vdp)$ | 0.031 | 0.014 | 0.031 | 0.031 |
| (5) $vdp > 60$ | 81.5 | 67.7 | 81.5 | 81.5 |
| (6) $0.0 < (Ds3w - Ds3t)/Lw < 0.2$ | 0.077 | 0.070 | 0.071 | 0.061 |
| (7) $0.0 < D4iw/Lw < 0.3$ | 0.276 | 0.192 | 0.239 | 0.252 |
| (8) $0.4 < f4/ft < 0.8$ | 0.773 | 0.659 | 0.712 | 0.716 |
| (9) $0.8 < f1234w/fw < 1.5$ | 0.872 | 0.831 | 1.070 | 1.095 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-245014, filed Dec. 21, 2017, which is hereby incorporated by reference herein in its entirety.

What is claimed is:

1. A zoom lens comprising, in order from an object side to an image side:
   a first lens unit having a positive refractive power;
   a second lens unit having a negative refractive power;
   an aperture stop;
   a third lens unit having a positive refractive power;
   a fourth lens unit having a positive refractive power; and
   a rear lens group including at least one lens unit,
   wherein an interval between each pair of adjacent lens units is changed during zooming,
   wherein the fourth lens unit includes a positive lens, and
   wherein the following conditional expressions are satisfied:

$0.2 < -m4/Lw < 1.0$;

$0.1 < (Ds4w - Ds4t)/Lw < 0.2$;

$3.0 < f4/fw < 4.5$; and $0.0 < \theta gFp - (0.6438 - 0.001682 \times vdp)$, where m4 represents an amount of movement of the fourth lens unit during zooming from a wide angle end to a telephoto end, Ds4w represents a distance between the aperture stop and the fourth lens unit at the wide angle end, Ds4t represents a distance between the aperture stop and the fourth lens unit at the telephoto end, f4 represents a focal length of the fourth lens unit, fw represents a focal length of the zoom lens at the wide angle end, Lw represents a length of the zoom lens at the wide angle end, vdp represents an Abbe number of a material of the positive lens with respect to a d-line, and θgFp represents a partial dispersion ratio of the material of the positive lens with respect to a g-line and an F-line.

2. The zoom lens according to claim 1, wherein the following conditional expression is satisfied:

$vdp > 60$, where vdp represents the Abbe number of the material of the positive lens with respect to the d-line.

3. The zoom lens according to claim 1, wherein the following conditional expression is satisfied:

$0.0 < (Ds3w - Ds3t)/Lw < 0.2$, where Ds3w represents a distance between the aperture stop and the third lens unit at the wide angle end, and Ds3t represents a distance between the aperture stop and the third lens unit at the telephoto end.

4. The zoom lens according to claim 1, wherein the following conditional expression is satisfied:

$0.0 < D4iw/Lw < 0.3$, where D4iw represents a distance between the fourth lens unit and an image plane at the wide angle end.

5. The zoom lens according to claim 1, wherein the following conditional expression is satisfied:

$0.4 < f4/ft < 0.8$, where ft represents a focal length of the zoom lens at the telephoto end.

6. The zoom lens according to claim 1, wherein the fourth lens unit consists of one positive lens.

7. The zoom lens according to claim 1, wherein the fourth lens unit consists of a cemented lens obtained by cementing a positive lens and a negative lens to each other.

8. The zoom lens according to claim 1, wherein the following conditional expression is satisfied:

$0.8 < f1234w/fw < 1.5$, where f1234w represents a combined focal length of a lens system from the first lens unit to the fourth lens unit at the wide angle end.

9. The zoom lens according to claim 1, wherein the rear lens group includes at least two lens units.

10. The zoom lens according to claim 9, wherein the rear lens group consists of, in order from the object side to the image side, a fifth lens unit having a negative refractive power and a sixth lens unit having a positive refractive power.

11. The zoom lens according to claim 9, wherein the rear lens group consists of, in order from the object side to the image side, a fifth lens unit having a positive refractive power, a sixth lens unit having a negative refractive power, and a seventh lens unit having a positive refractive power.

12. The zoom lens according to claim 9, wherein the rear lens group consists of, in order from the object side to the image side, a fifth lens unit having a positive refractive power and a sixth lens unit having a negative refractive power, which are arranged.

13. The zoom lens according to claim 1, wherein, during zooming from the wide angle end to the telephoto end, the first lens unit moves along a locus convex to the image side, the third lens unit moves toward the object side, and the fourth lens unit moves toward the object side.

14. An image pickup apparatus comprising:
a zoom lens; and
a photoelectric conversion element configured to receive an image formed by the zoom lens,
wherein the zoom lens includes, in order from an object side to an image side:
  a first lens unit having a positive refractive power;
  a second lens unit having a negative refractive power;
  an aperture stop;
  a third lens unit having a positive refractive power;
  a fourth lens unit having a positive refractive power; and
  a rear lens group including at least one lens unit,
wherein an interval between each pair of adjacent lens units is changed during zooming,
wherein the fourth lens unit includes a positive lens, and
wherein the following conditional expressions are satisfied:

$$0.2 < -m4/Lw < 1.0;$$

$$0.1 < (Ds4w - Ds4t)/Lw < 0.2;$$

$$3.0 < f4/fw < 4.5; \text{ and}$$

$$0.0 < \theta gFp - (0.6438 - 0.001682 \times vdp),$$

where m4 represents an amount of movement of the fourth lens unit during zooming from a wide angle end to a telephoto end, Ds4w represents a distance between the aperture stop and the fourth lens unit at the wide angle end, Ds4t represents a distance between the aperture stop and the fourth lens unit at the telephoto end, f4 represents a focal length of the fourth lens unit, fw represents a focal length of the zoom lens at the wide angle end, Lw represents a length of the zoom lens at the wide angle end, vdp represents an Abbe number of a material of the positive lens with respect to a d-line, and θgFp represents a partial dispersion ratio of the material of the positive lens with respect to a g-line and an F-line.

* * * * *